US008285972B2

(12) United States Patent
Wilson et al.

(10) Patent No.: US 8,285,972 B2
(45) Date of Patent: Oct. 9, 2012

(54) LOOKUP TABLE ADDRESSING SYSTEM AND METHOD

(75) Inventors: James Wilson, Foxboro, MA (US);
Joshua A. Kablotsky, Carlisle, MA (US); Yosef Stein, Sharon, MA (US);
Christopher M. Mayer, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 522 days.

(21) Appl. No.: 11/258,662

(22) Filed: Oct. 26, 2005

(65) Prior Publication Data

US 2007/0094474 A1    Apr. 26, 2007

(51) Int. Cl.
*G06F 9/34* (2006.01)
(52) U.S. Cl. .................. 711/220; 711/206; 345/602
(58) Field of Classification Search .................. None
See application file for complete search history.

(56) References Cited

U.S. PATENT DOCUMENTS

| | | | |
|---|---|---|---|
| 3,303,477 A | 2/1967 | Voigt | |
| 3,805,037 A | 4/1974 | Ellison | |
| 3,959,638 A * | 5/1976 | Blum et al. | 714/11 |
| 4,757,506 A | 7/1988 | Heichler | |
| 5,031,131 A | 7/1991 | Mikos | |
| 5,062,057 A | 10/1991 | Blacken et al. | |
| 5,101,338 A | 3/1992 | Fujiwara et al. | |
| 5,260,898 A | 11/1993 | Richardson | |
| 5,287,511 A | 2/1994 | Robinson et al. | |
| 5,351,047 A | 9/1994 | Behlen | |
| 5,386,523 A | 1/1995 | Crook et al. | |
| 5,530,825 A | 6/1996 | Black et al. | |
| 5,537,579 A | 7/1996 | Hiroyuki | |
| 5,666,116 A | 9/1997 | Bakhmutsky | |
| 5,675,332 A | 10/1997 | Limberg | |
| 5,689,452 A | 11/1997 | Cameron | |
| 5,696,941 A | 12/1997 | Jung | |
| 5,710,939 A | 1/1998 | Ballachino et al. | |
| 5,819,102 A | 10/1998 | Reed et al. | |
| 5,832,290 A | 11/1998 | Gostin et al. | |
| 5,937,438 A | 8/1999 | Raghunath et al. | |
| 5,961,640 A | 10/1999 | Chambers et al. | |
| 5,970,241 A | 10/1999 | Deao et al. | |
| 5,996,057 A | 11/1999 | Scales, III et al. | |
| 5,996,066 A | 11/1999 | Yung | |
| 6,009,499 A | 12/1999 | Koppala | |

(Continued)

FOREIGN PATENT DOCUMENTS

JP    04092921    3/1992

(Continued)

OTHER PUBLICATIONS

U.S. Appl. No. 11/258,801, filed Oct. 26, 2005, Wilson et al.

(Continued)

*Primary Examiner* — Kaushikkumar Patel
(74) *Attorney, Agent, or Firm* — Bingham McCutchen LLP

(57) ABSTRACT

Lookup table addressing of a set of lookup tables in an external memory is achieved by: transferring a data word from a compute unit to an input register in a data address generator; providing in at least one deposit-increment index register in the data address generator including a table base field for identifying the location of the set of tables in memory, and a displacement field; and depositing a section of the data word into a displacement field in the index register for identifying the location of a specific entry in the tables.

32 Claims, 14 Drawing Sheets

U.S. PATENT DOCUMENTS

| | | | |
|---|---|---|---|
| 6,029,242 | A | 2/2000 | Sidman |
| 6,061,749 | A | 5/2000 | Webb et al. |
| 6,067,609 | A | 5/2000 | Meeker et al. |
| 6,094,726 | A | 7/2000 | Gonion et al. |
| 6,134,676 | A | 10/2000 | VanHuben et al. |
| 6,138,208 | A | 10/2000 | Dhong et al. |
| 6,151,705 | A * | 11/2000 | Santhanam .................. 717/153 |
| 6,223,320 | B1 | 4/2001 | Dubey et al. |
| 6,230,179 | B1 | 5/2001 | Dworkin et al. |
| 6,263,420 | B1 | 7/2001 | Tan et al. |
| 6,272,452 | B1 | 8/2001 | Wu et al. |
| 6,285,607 | B1 | 9/2001 | Sinclair |
| 6,332,188 | B1 | 12/2001 | Garde et al. |
| 6,430,672 | B1 | 8/2002 | Dhong et al. |
| 6,480,845 | B1 | 11/2002 | Egolf et al. |
| 6,539,477 | B1 | 3/2003 | Seawright |
| 6,587,864 | B2 | 7/2003 | Stein et al. |
| 6,757,806 | B2 | 6/2004 | Shim |
| 6,771,196 | B2 | 8/2004 | Hsiun |
| 6,829,694 | B2 | 12/2004 | Stein et al. |
| 7,173,985 | B1 | 2/2007 | Diaz-Manero et al. |
| 7,187,729 | B2 | 3/2007 | Nagano |
| 7,243,210 | B2 | 7/2007 | Pedersen et al. |
| 7,424,597 | B2 * | 9/2008 | Lee et al. ..................... 712/210 |
| 7,728,744 | B2 | 6/2010 | Stein et al. |
| 7,882,284 | B2 | 2/2011 | Wilson et al. |
| 2003/0085822 | A1 | 5/2003 | Scheuermann |
| 2003/0103626 | A1 | 6/2003 | Stein et al. |
| 2003/0133568 | A1 | 7/2003 | Stein et al. |
| 2003/0149857 | A1 | 8/2003 | Stein et al. |
| 2003/0196072 | A1 * | 10/2003 | Chinnakonda et al. ......... 712/32 |
| 2003/0229769 | A1 | 12/2003 | Montemayor |
| 2004/0145942 | A1 | 7/2004 | Leijten-Nowak |
| 2004/0193850 | A1 | 9/2004 | Lee et al. |
| 2004/0210618 | A1 | 10/2004 | Stein et al. |
| 2005/0086452 | A1 | 4/2005 | Ross |
| 2005/0228966 | A1 | 10/2005 | Nakamura |
| 2005/0267996 | A1 | 12/2005 | O'Connor et al. |
| 2006/0143554 | A1 | 6/2006 | Sudhakar et al. |
| 2006/0271763 | A1 * | 11/2006 | Pedersen et al. .............. 711/220 |
| 2007/0044008 | A1 | 2/2007 | Chen et al. |
| 2007/0089043 | A1 | 4/2007 | Chae et al. |
| 2007/0094483 | A1 | 4/2007 | Wilson et al. |
| 2007/0277021 | A1 | 11/2007 | O'Connor et al. |
| 2008/0010439 | A1 | 1/2008 | Stein et al. |
| 2008/0244237 | A1 | 10/2008 | Wilson et al. |
| 2009/0089649 | A1 | 4/2009 | Wilson et al. |

FOREIGN PATENT DOCUMENTS

| | | |
|---|---|---|
| JP | 06110852 | 4/1994 |
| JP | 2001210357 | 8/2001 |
| JP | 02290494 | 10/2002 |
| JP | 05513541 | 5/2005 |
| WO | WO-96/010226 | 4/1996 |
| WO | WO-03/067364 | 8/2003 |

OTHER PUBLICATIONS

International Search Report and Written Opinion for International Application No. PCT/US2008/010571 mailed Nov. 25, 2008, 5 pages.
English translation of Office Action for Japanese Patent Application No. 2008537761, mailed Mar. 8, 2011, 5 pages.
Examination Report for European Patent Application No. 06817002.6 mailed Sep. 16, 2009, 5 pages.
Examination Report for European Patent Application No. 06817042.2 mailed May 26, 2010, 6 pages.
English translation of Office Action for Taiwan Patent Application No. 095139563, mailed Jul. 14, 2010, 7 pages.
English translation of Office Action for Chinese Patent Application No. 200680039988.6, mailed Dec. 4, 2009, 4 pages.
English translation of Office Action for Chinese Patent Application No. 200680047898.1, mailed Jan. 8, 2010, 5 pages.
Examination Report for European Patent Application No. 06817042.2, mailed May 26, 2010, 6 pages.
English translation of Office Action for Chinese Patent Application No. 200680039988.6, mailed Jun. 10, 2010, 6 pages.
"Microsoft Computer Dictionary", 2002, Microsoft Press, 5th ed., p. 474.
Citron et al. "Accelerating Multi-Media Processing by Implementing Memoing in Multiplication and Division Units," ACM Sigplan Notices, ACM, Association for Computer Machinery, NY, NY, vol. 33, No. 11, Nov. 1998, pp. 252-261.
Goslin, "A Guide to Using Field Programmable Gate Arrays (FPGAs) for Application-Specific Digital Signal Processing Performance," [online], Xilinx, Dec. 1995 [retrieved Aug. 19, 2009]. Retrieved from the Internet: <http://www.xilinx.com/appnotes/dspguide.pdf>, 11 pages.
Hendrix et al., "Viterbi Decoding Techniques for the TMS32054x DSP Generation," Texas Instruments, Application Report SPRA071A—Jan. 2002, pp. 1-8.
Hennessy et al. "Computer Organization and Design: The Hardware/Software Interface" Morgan Kaufmann Publishers, Inc., 2nd ed., 1997, pp. 449-465.
Intel, Pentium Processor Family Developers Manual, [online], vol. 3, Architecture and Programming Manual, 1995, [retrieved Dec. 7, 2009]. Retrieved from the Internet: <http://download.intel.com/design/pentium/MANUALS/24143004.pdf>, retrieved Dec. 7, 2009, 1032 pages.
Richardson, "Exploiting Trivial and Redundant Computation," Computer Arithmetic, 1993, Proceedings, 11th Symposium on Windsor, Ont. Canada, Jun. 29-Jul. 2, 1983, Los Alamitos, CA, USA, IEEE Comput. Soc., Jun. 1993, pp. 220-227.
Yadav et al., "Software-Only Multiple Variable Length Decoding for Real-Time Video on MDSP," International Conference on Consumer Electronics, 2005, ICCE, 2005 Digest of Technical Papers, Jan. 8-12, 2005, DOI: 0-7803-8838-0/05 2005, pp. 141-142.
International Search Report for International Application No. PCT/US2006/040510, mailed Oct. 17, 2007, 2 pages.
Written Opinion for International Application No. PCT/US2006/040510, mailed Oct. 17, 2007, 9 pages.
Supplementary European Search Report and Opinion for European Patent Application No. 06817042.2, mailed Nov. 17, 2008, 8 pages.
English translation of Office Action for Chinese Patent Application No. 200680039988.6, mailed Jun. 19, 2009, 7 pages.
International Search Report for International Application No. PCT/US2008/010524, mailed Nov. 28, 2008, 1 page.
Written Opinion for International Application No. PCT/US2008/010524, mailed Nov. 28, 2008, 7 pages.
International Search Report for International Application No. PCT/US2006/040414, mailed Oct. 1, 2007, 1 page.
Written Opinion for International Application No. PCT/US2006/040414, mailed Oct. 1, 2007, 7 pages.
English translation of Office Action for Taiwan Patent Application No. 095139557, mailed Sep. 29, 2009, 5 pages.
Supplementary European Search Report and Opinion for European Patent Application No. 06817002.6, mailed Mar. 17, 2009, 5 pages.
International Search Report for International Application No. PCT/US2008/002914, mailed Jun. 27, 2008, 1 page.
Written Opinion for International Application No. PCT/US2008/002914, mailed Jun. 27, 2008, 4 pages.
International Search Report for International Application No. PCT/US2008/010571, mailed Nov. 25, 2008, 2 pages.
Written Opinion for International Application No. PCT/US2008/010571, mailed Nov. 25, 2008, 4 pages.
English translation of Office Action for Japanese Patent Application No. 2008537767, mailed Aug. 2, 2011, 7 pages.

* cited by examiner

CHART I

| ADSL MODEM CLOCK CYCLE | s0 | s1 | s2 | s3 |
|---|---|---|---|---|
| 0 | s3 | $s0 + u2_0$ | s1 | $s1 + s2 + u1_0$ |
| 1 | $s1 + s2 + u1_0$ | $s3 + u2_1$ | $s0 + u2_0$ | $s0 + u2_0 + s1 + u1_1$ |
| 2 | $s0 + u2_0 + s1 + u1_1$ | $s1 + s2 + u1_0 + u2_2$ | $s3 + u2_1$ | $s3 + u2_1 + s0 + u2_0 + u1_2$ |
| 3 | $s3 + u2_1 + s0 + u2_0 + u1_2$ | $s0 + u2_0 + s1 + u1_1 + u2_3$ | $s1 + s2 + u1_0 + u2_2$ | $s1 + s2 + u1_0 + u2_2$ $+ s3 + u2_1 + u1_3$ |
| 4 | $s1 + s2 + u1_0 + u2_2$ $+ s3 + u2_1 + u1_3$ | $s3 + u2_1 + s0 + u2_0 + u1_2$ $+ u2_4$ | $s0 + u2_0 + s1 + u1_1 + u2_3$ | $s0 + u2_0 + s1 + u1_1 + u2_3$ $+ u1_0 + u2_2 + u1_4$ |
| 5 | $s0 + u2_0 + s1 + u1_1 + u2_3$ $+ s2 + u2_2 + u1_4$ | $s1 + s2 + u1_0 + u2_2$ $+ s3 + u2_1 + u1_3 + u2_5$ | $s3 + u2_1 + s0 + u2_0 + u1_2$ $+ u2_4$ | $s1 + u1_1 + u2_3 + s3 + u2_1$ $+ u1_2 + u2_4 + u1_5$ |
| 6 | $s1 + u1_1 + u2_3 + s3 + u2_1$ $+ u1_2 + u2_4 + u1_5$ | $s0 + u2_0 + u1_2 + u2_4 + s1 + s2$ $+ u1_0 + u2_2 + u1_3 + u2_5$ | $s1 + s2 + u1_0 + u2_2$ $+ s3 + u2_1 + u1_3 + u2_5$ | $s0 + u2_0 + u1_1 + u2_3 + s1 + s2$ $+ u1_0 + u2_2 + u1_3 + u2_4 + u1_5$ |
| 7 | $s0 + u2_0 + u1_2 + u2_4 + s1 + s2$ $+ u1_0 + u2_2 + u1_3 + u2_5 + u1_6$ | $s1 + u1_1 + u2_3 + s3 + s2$ $+ u1_2 + u2_4 + u1_5 + u2_7$ | $s0 + u2_0 + u1_1 + u2_3 + s2$ $+ u1_0 + u2_2 + u1_3 + u2_4 + u2_6$ | $s0 + u2_0 + u1_1 + u2_3 + s1 + s2$ $+ s1 + s3 + u2_1 + u1_3 + u2_5 + u1_7$ |

FIG. 10

CHART II

| GFL CLOCK CYCLE 1 | | | |
|---|---|---|---|
| ADSL Modem Clock Cycle 7 | 151 | 153 | 155 |
| $s0_{n+1} = s3 + y2_1 + s0 + y2_0 + z1_2$ | $= s3 + y2_1 + s0 + y2_0 + z1_2 + s1 + s2 + z1_0 + y2_2 + s3 + y2_1 + z1_3 + y2_5 + y2_4 + z1_6$ | $= s0 + u2_0 + u1_2 + u2_4 + s1 + s2 + u1_0 + u2_2 + u1_3 + u2_5 + u1_6$ |
| $s1_{n+1} = s0 + u2_0 + s1 + u1_1 + u2_3$ | $= s3 + y2_1 + s0 + y2_0 + z1_2 + s0 + y2_0 + s1 + z1_2 + y2_3 + y2_4 + y2_7 + z1_5$ | $= s1 + u1_1 + u2_3 + s3 + u2_1 + u1_2 + u2_4 + u1_5 + u2_7$ |
| $s2_{n+1}$ | — — — | — — — | — — — |
| $s3_{n+1}$ | — — — | — — — | — — — |

*FIG. 12*

LOOKUP TABLE ADDRESSING SYSTEM AND METHOD

FIELD OF THE INVENTION

This invention relates to an improved lookup table addressing system and method.

BACKGROUND OF THE INVENTION

As computer speed increased from 33 MHz to 1.0 GHz and beyond, the computer operations could not be completed in one cycle. As a result the technique of pipelining was adopted to make most efficient use of the higher processor performance and to improve throughput. Presently, deep pipelining uses as many as 15 stages or more. Generally, in a pipelined computing system there are several parallel building blocks working simultaneously where each block takes care of different parts of the whole process. For example, there is a compute unit (CU) that does the computation, an address unit including a data address generator (DAG) that fetches and stores the data in memory according to the selected address modes and a sequencer or control circuit that decodes and distributes the instructions. The DAG is the only component that can address the memory. Thus, in a deeply pipelined system if an instruction is dependent on the result of a previous one, a pipeline stall will happen where the pipeline will stop, waiting for the offending instruction to finish before resuming work. For example, if, after a computation, the output of the CU is needed by the DAG for the next data fetch, it can't be delivered directly to the DAG to be conditioned for a data fetch: it must propagate through the pipeline before it can be processed by the DAG to do the next data fetch. This is so because only the DAG has access to the memory and can convert the compute unit result to an address pointer to locate the desired data. In multi-tasking general purpose computers this stall may not be critical but in real time computer systems such as used in e.g., cell phones, digital cameras, these stalls are a problem. See U.S. patent application, entitled: IMPROVED PIPELINE DIGITAL SIGNAL PROCESSOR, by Wilson et al. (AD-432J) filed on even date herewith, herein incorporated in its entirety by this reference.

In one application bit permutation is used to effect data encryption. This can be done in the CU but the arithmetic logic units (ALU) in the CU are optimized for 16, 32, or 64 bit operations and are not efficient for bit by bit permutation. For example, if the permutation is done by the ALU, each bit requires three cycles of operation: mask, shift and OR. Thus, permuting a single 32 bit word requires 96 cycles or more.

In another approach instead of performing the permutations in the ALU, the permutation values can be stored in a lookup table located in external storage. However, now, the R register in the ALU must deliver the word e.g. 32 bits to a pointer (P) register in the DAG which can address the external memory lookup table. But this requires an enormous lookup table (LUT), i.e., $2^{32}$ bits or more then 33.5 megabytes of memory. To overcome this, the 32 bit word in the R register in the ALU can be processed, e.g., as four bytes (8 bits) or eight nibbles (4 bits). This reduces the memory size required: for four bytes there is needed four tables of 256 entries, each of 32 bits (or a 4 Kbyte LUT) and for eight nibbles there is needed eight tables of sixteen entries, each of 32 bits (or a 512 byte LUT). But this, too, creates problems: now the ALU requires four (bytes) or eight (nibbles) to be transferred to the DAG's P register for a single 32 bit word. Each transfer in turn causes a number of pipeline stalls as discussed, supra.

In a separate but related problem linear feedback shift registers (LFSR's) e.g. CRC's, scramblers, de-scramblers, trellises encoding are widely used in communication systems. The LFSR operations can be scaled by the CU one bit at a time using mask/shift/OR cycles as explained above with the same problems. Or a specific hardware block, e.g. ASIC, FPGA that solves the LFSR problem using 4, 8, or 16 bits per cycle can be used. Both the mask/shift/OR approach in the CU and the ASIC approach can be eliminated by using an external lookup table or tables but with all the aforesaid shortcomings.

BRIEF SUMMARY OF THE INVENTION

It is therefore an object of this invention to provide an improved lookup table addressing system and method.

It is a further object of this invention to provide such an improved lookup table addressing system and method which minimizes pipeline stall between compute unit and data address generator.

It is a further object of this invention to provide such an improved lookup table addressing system and method which optimizes the size of the lookup table.

It is a further object of this invention to provide such an improved lookup table addressing system and method which accelerates linear feedback shift register operations without additional dedicated hardware, e.g. ASIC or FPGA.

It is a further object of this invention to provide such an improved lookup table addressing system and method which is faster and requires less power.

It is a further object of this invention to provide such an improved lookup table addressing system and method which can reuse existing processor components.

It is a further object of this invention to provide such an improved lookup table addressing system and method which accelerates permutation operations without added hardware, e.g. ASIC, FPGA.

It is a further object of this invention to provide such an improved lookup table addressing system and method which is fully scalable to accommodate larger memory requirements.

It is a further object of this invention to provide such an improved lookup table addressing system and method which is adaptable for a variety of different applications e.g., encryption, permutation, and linear feedback shift register implementation including CRC, scrambling, de-scrambling and trellis.

The invention results from the realization that an improved lookup table addressing system and method which minimizes pipeline stall, optimizes lookup table size, is faster, uses less power, reuses existing processing components and, is scalable and adaptable for a variety of different applications can be achieved by transferring a data word from a compute unit to an input register in a data address generator; providing in at least one deposit-increment index register in the data address generator having a table base field for identifying the location of the set of tables in memory, a table index field for identifying the location of a specific one of the tables in the set and a displacement field; and depositing a section of the data word into the displacement field of the deposit-increment index register for identifying the location of a specific entry in the tables.

The subject invention, however, in other embodiments, need not achieve all these objectives and the claims hereof should not be limited to structures or methods capable of achieving these objectives.

This invention features a lookup table addressing system having a set of lookup tables in an external memory including a data address generator having an input register for receiving a data word from a compute unit and a deposit increment index register having a table base for identifying the location of the set of tables in memory. A displacement field identifies the location of a specific entry in that specific table, the data address generator is configured to deposit a section of the data word into the displacement field to access the specific entry.

In a preferred embodiment the entries include the partial results of the corresponding section of the data word. The compute unit may include an accumulator register, a lookup table destination register and a combining circuit; the compute unit may be configured to accumulate the partial results from all of the sections of the data word to obtain the final result. The destination register can be any of the compute units data register files. The data address generator may include a plurality of pointer registers and the deposit-increment index register may be implemented by one of the pointer registers. The data address generator may also include a plurality of pointer registers and the deposit-increment input register may be implemented by one of the pointer registers. The index field of the deposit-increment index register may be configured to increment to identify the next table in the set. The partial result may include the data bits of the corresponding section and the data address generator may be further configured to map those bits to a predetermined output word. The destination word and the data word may have an equal number of bits. The destination word and the data word may have an unequal number of bits. The combining circuit may be an exclusive OR circuit. The combining circuit may be a summing circuit. The data address generator may include a second index register and the data address generator may be configured to deposit a second section of the data word into the displacement field of the second deposit increment index register. The data address generator may be configured to preload the index register to a known table address. The known table address may be a start address. The bit field may be a byte. The bit field may be a nibble.

This invention also features a lookup table addressing method for servicing a set of lookup tables in an external memory including transferring a data word from a compute unit to an input register in a data address generator. There is provided, in at least one deposit-increment index register in the data address generator, including a table base field for identifying the location of the set of tables in memory and a displacement field in the index register for identifying the location of a specific entry in the tables.

In a preferred embodiment the entries may include partial results of the corresponding section of the data word. The partial results from all sections of the data word may be accumulated to obtain the final results. A table base field may be incremented to identify the next table in the set in the data address generator. The partial result may include data bits and may also include mapping those bits to a predetermined output word. The output word and the data word may have an equal number of bits. The output word and the data word may have an unequal number of bits. Accumulating may include exclusive-ORing. Accumulating may include summing. It may include depositing a second section of the data word into another index register displacement field for identifying the location of another specific entry in parallel with the first. It may include preloading the index register to a known table address. The index register may be preloaded to the starting address. The section may be a bit field. The bit field may be a nibble or a byte.

DESCRIPTION OF THE DRAWINGS

Other objects, features and advantages will occur to those skilled in the art from the following description of a preferred embodiment and the accompanying drawings, in which:

FIG. 10 is a Chart I illustrating the four state conditions of the ADSL Modem Trellis of FIG. 9 over eight clock cycles;

FIG. 12 shows Chart II illustrating conditions occurring in the Galois field linear transformer system of FIG. 11;

DISCLOSURE OF THE PREFERRED EMBODIMENT

Figure 1:
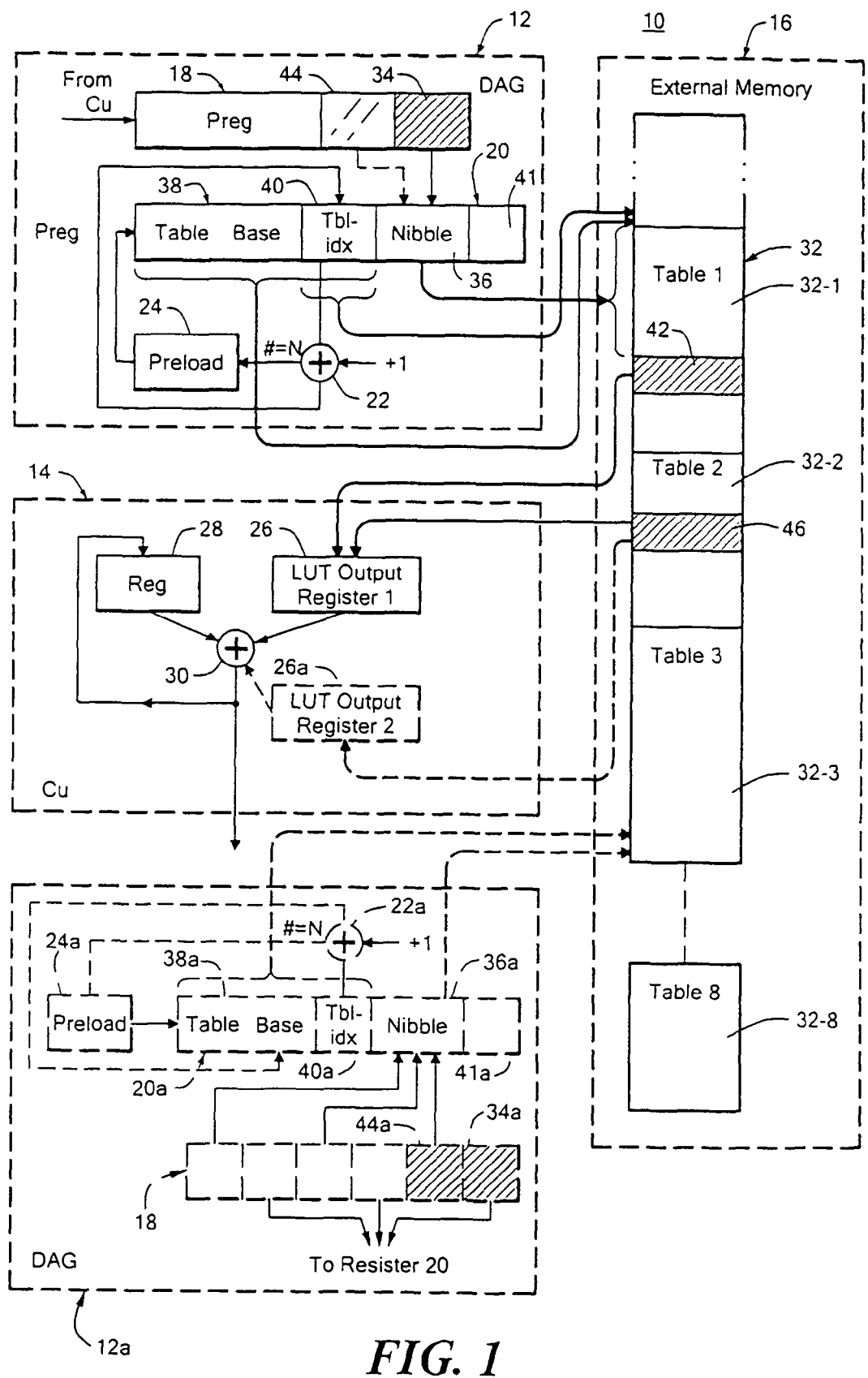
FIG. 1 is a schematic diagram of a lookup table addressing system according to this invention implemented in a DAG and CU of a DSP.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a lookup table addressing system 10 according to this invention implemented in an existing data address generator (DAG) 12 and compute unit (CU) 14 for servicing a set of lookup tables in external memory 16. DAG 12 and CU 14 may be parts of a conventional processor such as a digital signal processor (DSP). In the DAG there are used two pointer (P) registers, one as the data word input register 18 and the second as deposit-increment index register 20, incrementing circuit 22 and preload circuit 24. In CU 14 there is a lookup table (LUT) destination register 26, accumulator 28, and combining circuit 30, here shown simply as a GF-2 adder (XOR) or summing circuit. In CU 14 any of its registers file can be used as the LUT destination register 26. External memory 16 includes among the rest of the data stored there a set of lookup tables 32 which includes a number of individual tables. For example, if the lookup table addressing system 10 is to work on a thirty-two bit data word with nibbles, that is, four bit groups, then there would be eight tables with sixteen entries each, or four tables with 256 entries each if it is to work with bytes.

The LUT deposit-increment index register 20 generates the effective memory address as function of table base bit field 38, table index bit field 40, deposit bit field 36 and the zero bit field 41. In operation, a data word from CU 14 is delivered to the DAG data input word register 18. One section of it, for example, a first nibble 34 is deposited directly into displacement bit field 36. The table base bit field 38 identifies the starting location of the set of tables 32 in external memory 16. The index field 40 identifies the location of the particular table 32-1 through 32-8 in table set 32, and the zero field 41 which accommodates for LUT entry width. If a thirty-two bit LUT access is used the ZERO field will contain two zeros, or one zero if a sixteen bit LUT access is used. The section or nibble 34 deposited in displacement field 36 is the address displacement of the specific entry in a particular table, for example, entry 42. Assuming that the system is being used to permute one nibble at a time of a 32 bit word transferred to the DAG input register 18, then entry 42 will contain four bits plus a mapping location into a 32 bit word. The four bits are a permutation of the bits in nibble 34 deposited in displacement field 36. These four bits and the information which maps their location in a 32 bit word is delivered to a 32 bit LUT destination register 26 in CU 14. The four bits from specific entry 42 will be loaded into four of those thirty-two locations in accordance with the mapping information in entry 42. This partial result is combined by combining circuit or GF-2 adder 30 (Xor) with the contents of accumulator register 28. Since this is the initial cycle of operation, register 28 contains zero. Thus, after combining the outputs of the two registers in adder 30, the accumulated result in register 28 is nothing more than the contents of LUT destination register 26. Next, incrementing circuit 22 increments the table index 40 value by one and feeds it back as the new table index so that the system moves to Table 2, 32-2. At the same time the next section of the data word in data word input register 18, the nibble in the next section 44 of data input register 18, is delivered to displacement field 36. This now identifies another specific entry 46 in Table 2 which is mapped into LUT destination register 26. The output from register 26 is once again combined by GF-2 adder (Xor) 30 with the contents of register 28 and the combined results are accumulated and stored in register 28. Now register 28 contains a combination of the data from specific entry 42 mapped into a 32 bit word format combined with the specific entry 46 whose 4 bits are mapped to four other positions in the 32 bit word format. This continues until all eight nibbles in the thirty-two bit word present in register 18 are completed. At that point incrementing circuit 22 has reached eight and preload circuit 24 will preload the table base back to the beginning of the set of tables. Preload circuit 24 could in fact preload table base field 38 to any particular place.

The advantages of the invention can be seen by contrasting it with conventional operations. In a conventional operation the data word is moved a nibble or a byte at a time from the R register in the CU to the input P input register in the DAG. In deep pipeline operations this means that there will be several stalls for each nibble or byte so transferred. In addition, the operations of depositing the nibble or byte data into the displacement field and incrementing to the next table, have to be manually performed by the DAG. In contrast, with this invention, the entire data word is transferred at once from the R register in the CU to the P input register in the DAG so the several stalls that have to be endured are only endured once for the entire data word rather than once for each eight nibbles or each of the four bytes. In addition, the operation of depositing the nibble or byte data into the displacement field and incrementing to the next table each time can now be done automatically by the DAGs own circuits.

In the DAG there may be more than one available input register 18a and deposit-increment index register 20a Input registers 18 and 18a can actually be a single register which services both deposit-increment index register 20 and deposit-increment index register 20a. There can also be additional increment circuits 22a and preload circuits 24a.

In that case using a second LUT destination register 26a in CU 14 the operation may be carried out twice as fast. With the same data word installed in input register 18 and 18a the system can look at nibble 34 in register 18 and deliver it to displacement field 36 in register 20 while nibble 44a in register 18a can be delivered to displacement field 36a. Thus while DAG 12 in FIG. 1 is retrieving specific entry 42 in Table 1 DAG 12a can be retrieving specific entry 46 in Table 2 and delivering it to LUT destination register 26a so that the mapped nibble in registers 26 and 26a are combined together with the contents of accumulator register 28 and that the system can move twice as fast. On the next cycle the system will move to Table 3 and 4 and then Tables 5 and 6 and finally Tables 7 and 8.

Figure 2:
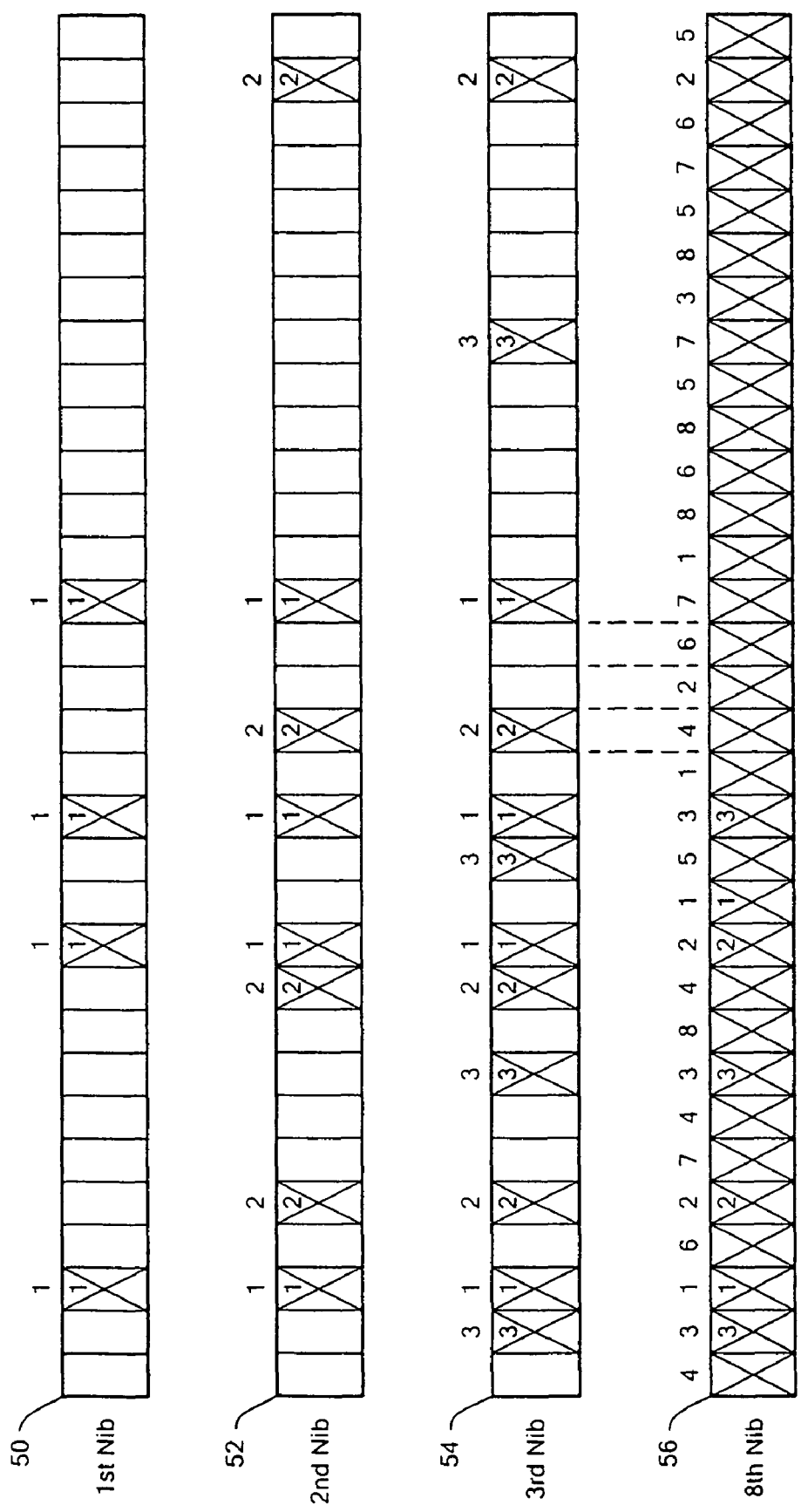
FIG. 2 is a representation of the cumulative mapping of a number of partial results into a final result in 32 bit word format.

Permuting of a thirty-two bit input register such as 18 is done by dividing the input register into eight nibbles, groups of 4 bits, and combining the partial results of all permuted nibbles, for example. The first nibble, such as nibble 34 in register 18 of FIG. 1, is shown mapped to the thirty-two bit word format 50, FIG. 2, of accumulator register 28, FIG. 1. The four mapped bits of this first operation are indicated by the X's with the 1's. With the next nibble 44, the X marked bits accompanied by a 2 as shown in 52, FIG. 2, are mapped into LUT destination register 26 and the combination is as shown in thirty-two bit format 52, FIG. 2. After the third nibble the word format in accumulator register 28 appears at 54, FIG. 2. After all eight cycles of operation the contents of register 28, FIG. 1, appear as shown at word format 56, FIG. 2, where all of the thirty-two bits in eight groups or nibbles of four bits each have been mapped to the final result shown at 56 by combining each of the partial results shown in 50, 52, 54, and the intervening states which for simplicity have not been shown.

Figure 3:
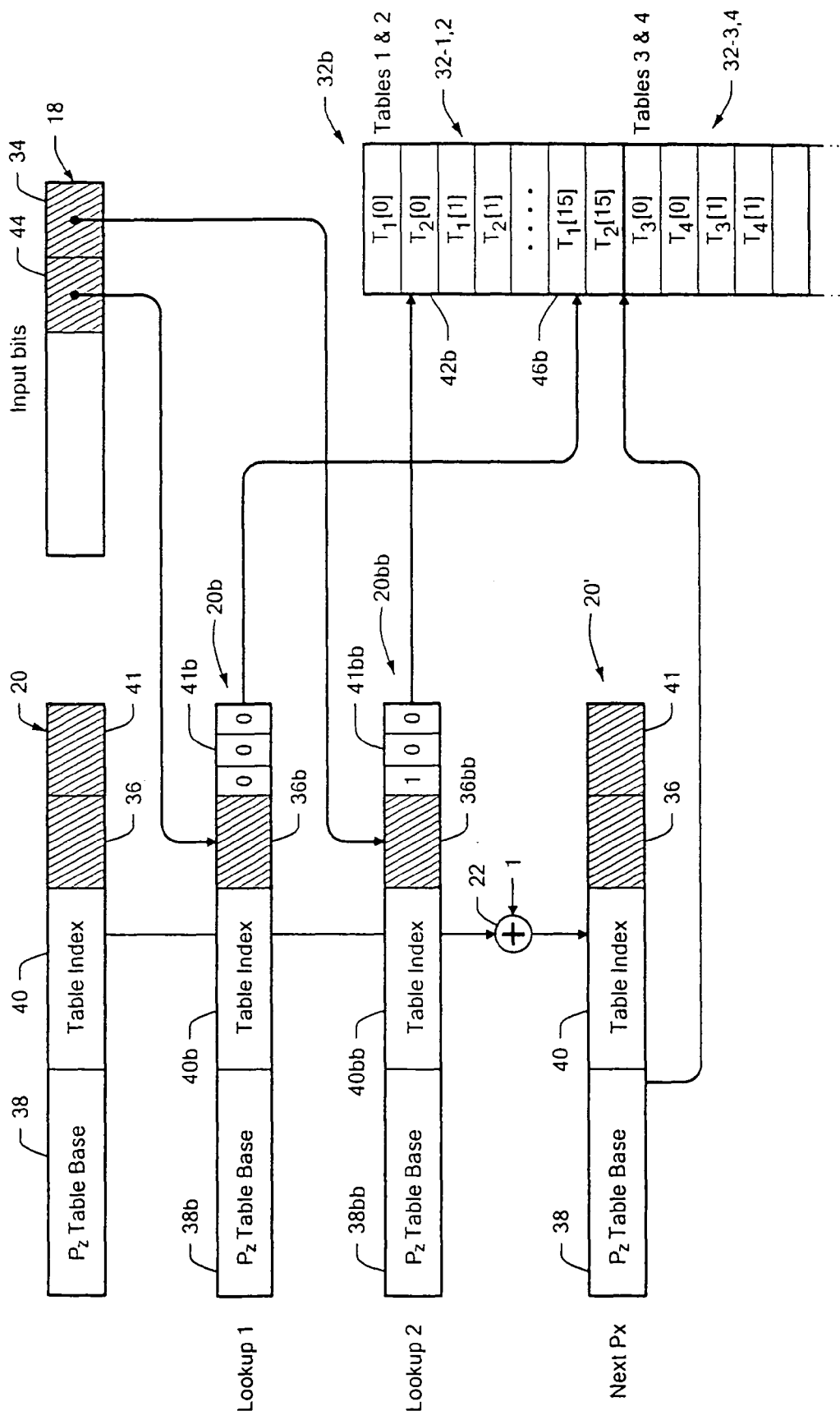
FIG. 3 is a schematic block diagram of an alternative embodiment of the DAG portion of the system of FIG. 1.

In an alternative construction there may be two P index registers, 20b, 20bb, FIG. 3, which operate in an interleaved fashion to retrieve entries from lookup table set 32b. For example, in the case of permuting a thirty-two bit data word the zeros field 41b in index register 20b may include all zeros for fetching all even thirty-two bit words while zeros field 41bb in register 20bb may include a one followed by two zeros for fetching all odd thirty-two bit words as shown. Then, while index register 20bb is processing the nibble 34 in its displacement field 36bb and retrieving a specific entry 42b from Table 2, index register 20b having received nibble 44 in its displacement field 36b will be seeking specific entry 46b from Table 1. Note that addressable data entries of Tables 1 and 2 have been interleaved as have Tables 3 and 4; 5 and 6; 7 and 8. After incrementing, the table index, index register 20 now appears as index register 20'. In this case by using a second P index register 20bb a thirty-two bit input register may be permuted twice as fast.

Figure 4:
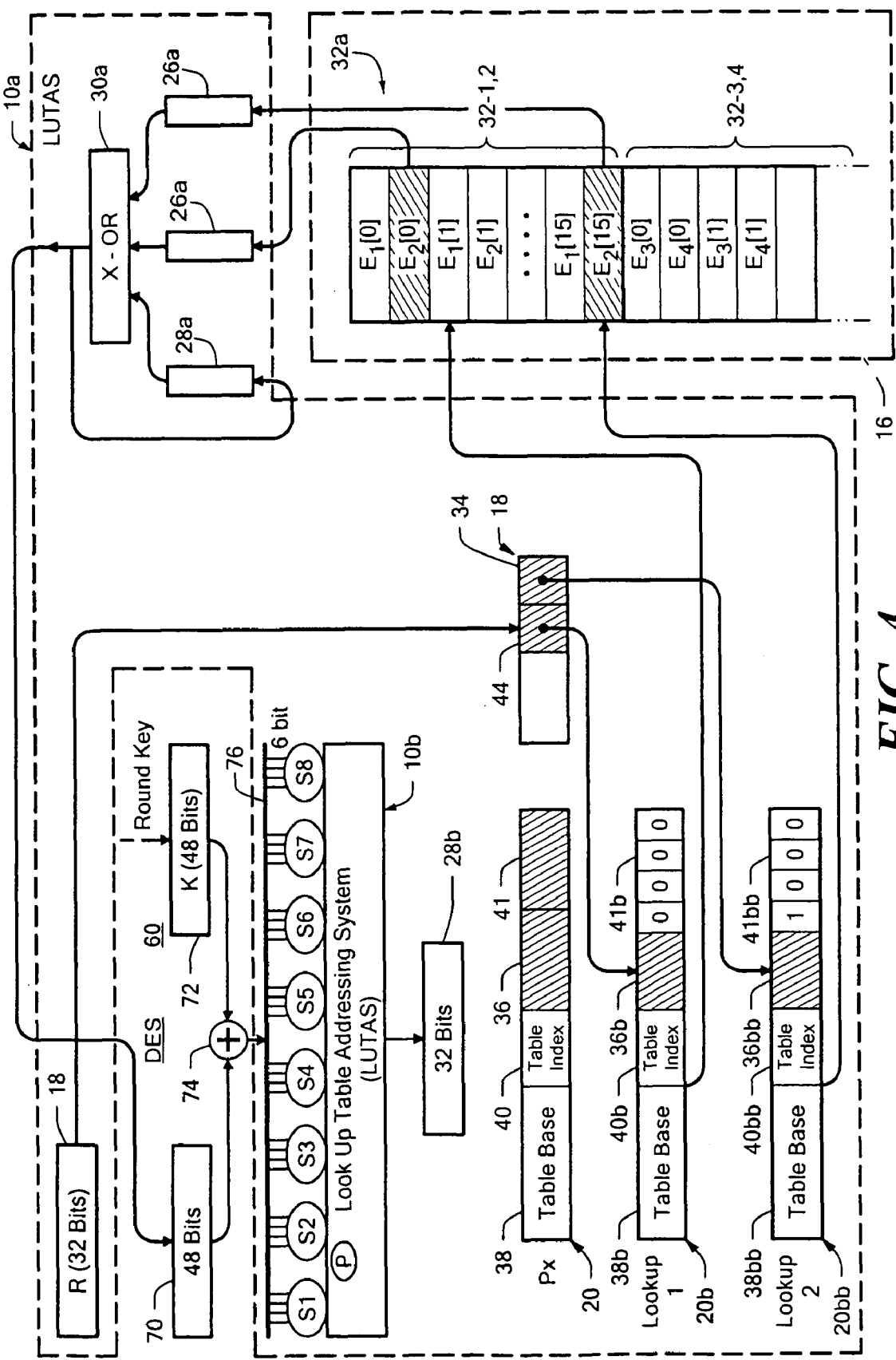
FIG. 4 is a schematic block diagram of a DES encryption system implemented using two of the lookup table addressing systems of FIG. 1 as modified by the embodiment of FIG. 3.

Although thus far the invention has been explained only with respect to a permutation operation, it can be used in a number of other applications to great advantage. For example, in FIG. 4 the lookup table addressing system 10a of this invention is used to implement a DES encryption system 60 by using the lookup table addressing system twice. The first lookup table set will permute and expand the thirty-two input bits of register 18 into a forty-eight bit rendition and placed in register 70 of DES system 60. It is then combined with a forty-eight bit round key stored in register 72 using summing circuit 74. A second lookup table set 10b, that implements the S-Box followed by the P permutation according to this invention, can be used to take the six bit groups from register 70 of DES system 60 and convert them back to thirty-two bits according to specific DES rules and place the final result in accumulator register 28b. In the DES application of FIG. 4 notice that the combining circuit is implemented as an exclusive OR gate 30a.

Figure 5:
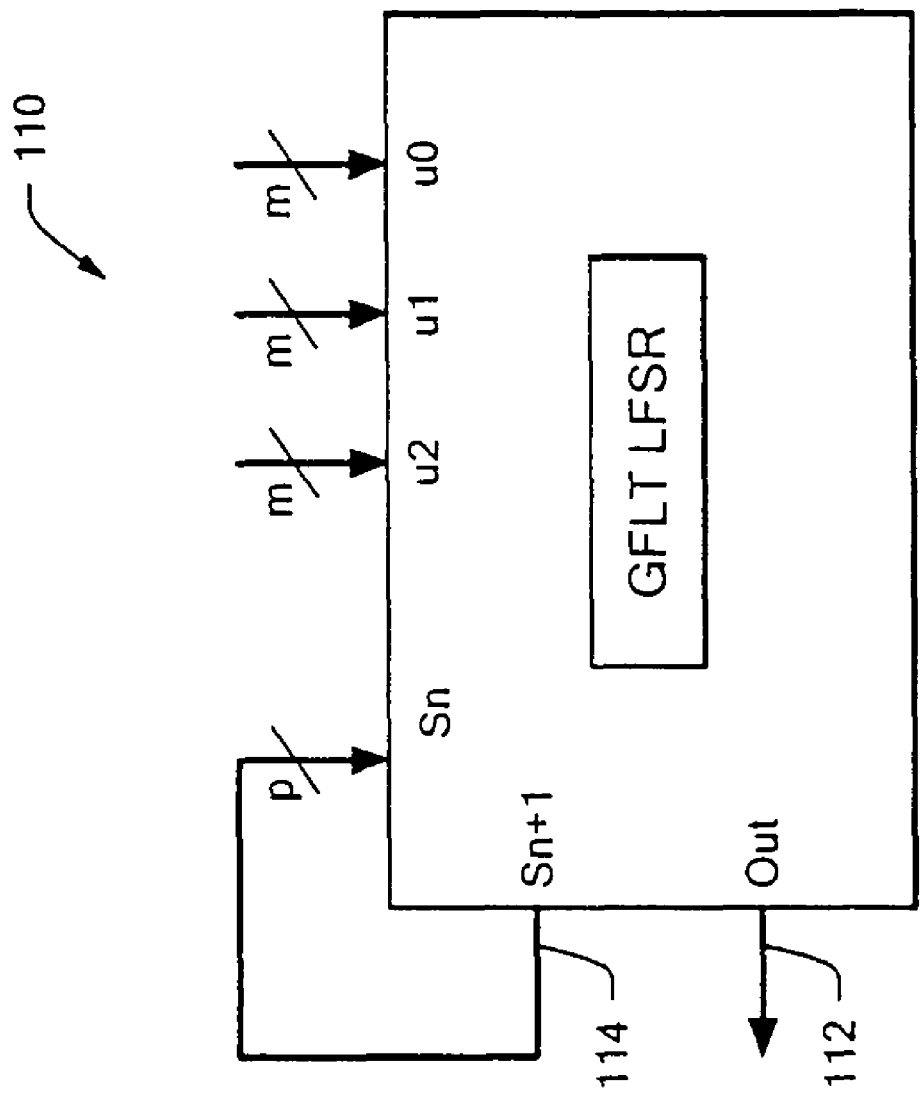
FIG. 5 is a schematic block diagram of a Galois field linear transformer implementation of a linear feedback shift register trellis system implementable with this invention.
Figure 6:
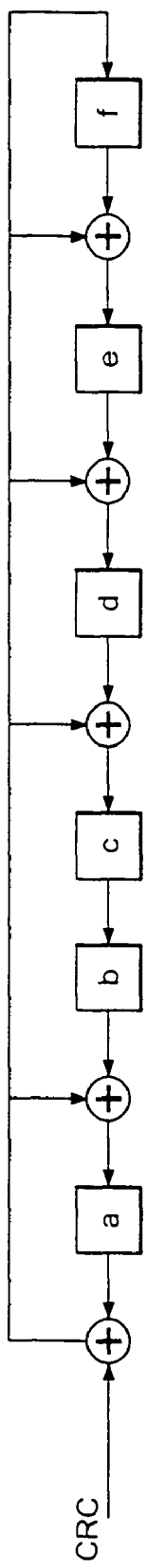
FIG. 6 is a schematic block diagram of an LFSR CRC.
Figure 7:
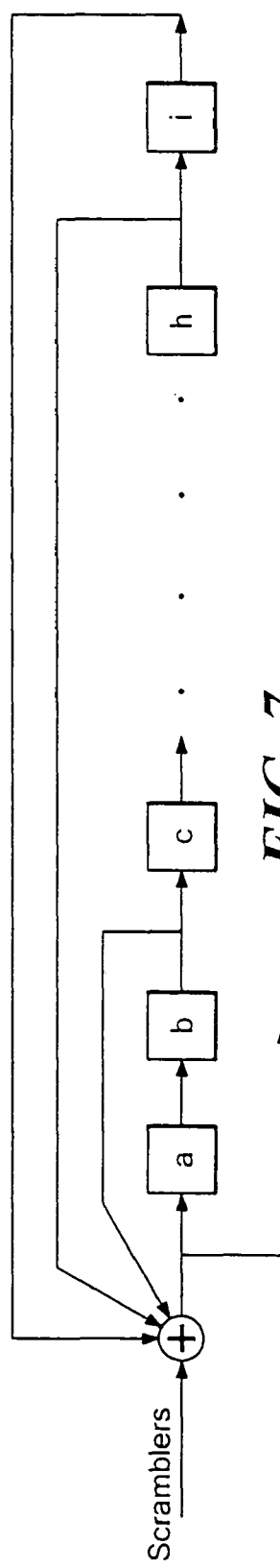
FIG. 7 is a schematic block diagram of an LFSR scrambler.
Figure 8:
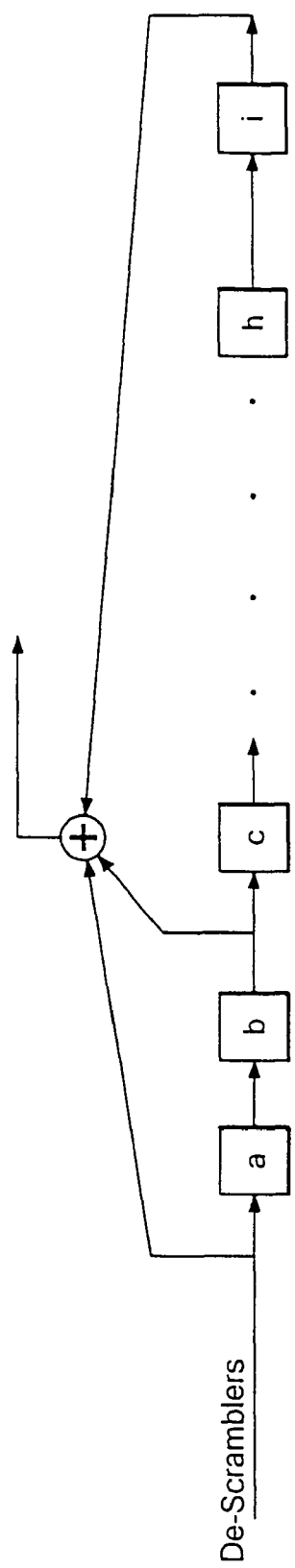
FIG. 8 is a schematic block diagram of an LFSR de-scrambler.

The invention may also be used to great advantage in connection with linear feedback shift registers (LFSRS) such as Galois Field Linear Transformer (GFLT) LFSR 110 in FIG. 5, which is a trellis system that receives a number of input bits in one or more trellis bit streams designated generally as u3, u2, and u1 and a trellis state output of the matrix designated as Sn, from which the system generates an output 112 and the next new trellis state output 114 designated as Sn+1. There are a number of different kinds of linear feedback shift registers including CRC's, FIG. 6, scramblers, FIG. 7, de-scramblers FIG. 8 and trellis FIG. 9. The application of this invention to such a system will be explained now with respect to FIGS. 9-13.

Figure 9:
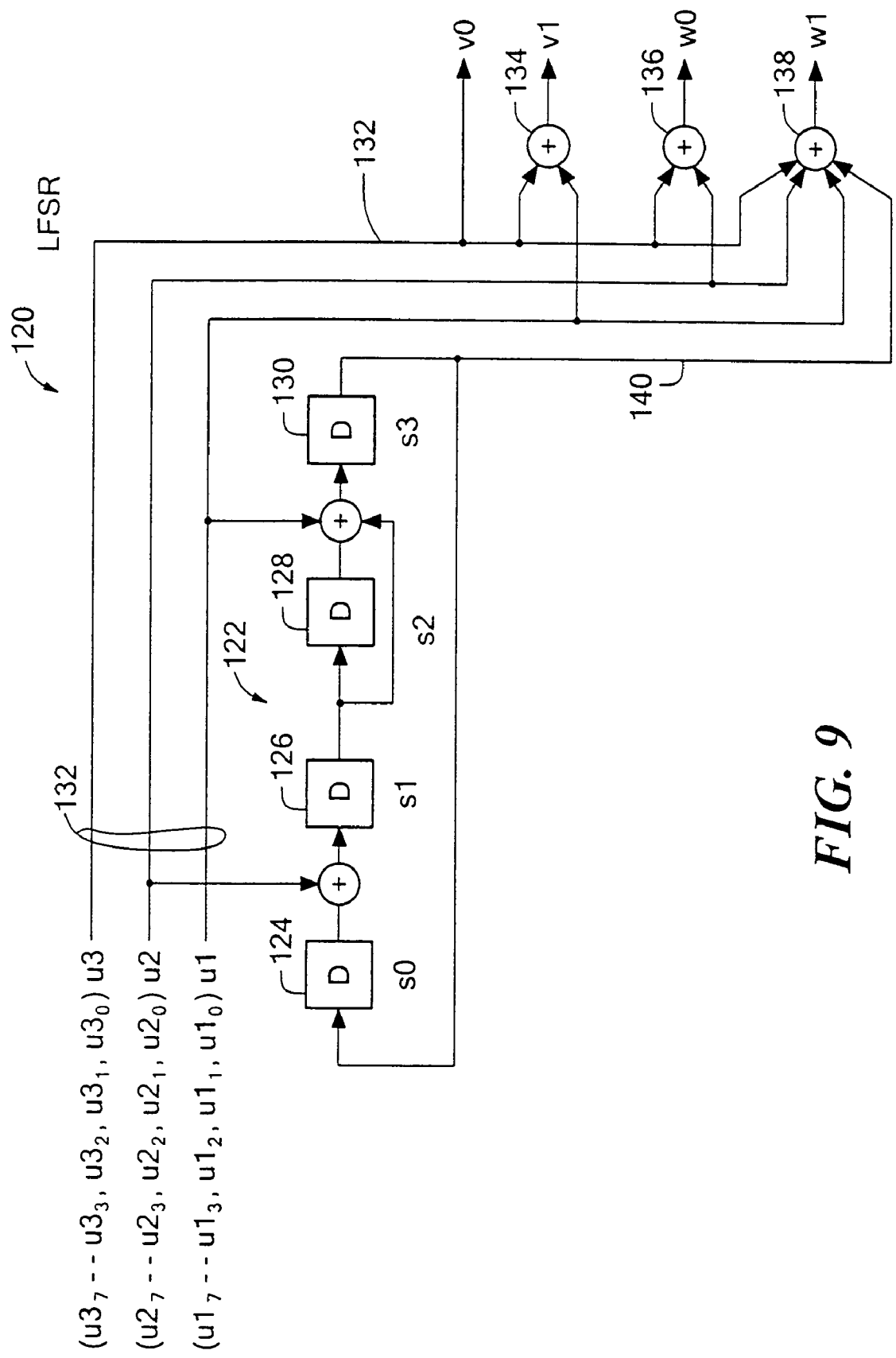
FIG. 9 is a schematic block diagram of an LFSR trellis.

There is shown in FIG. 9 a typical trellis system such as in ADSL Modem Trellis 120 implemented in hardware as a linear feedback shift register (LFSR) 122. Linear feedback shift register 122 includes four storage devices, flip-flop 124, 126, 128 and 130, which represent the states s0, s1, s2, and s3 of the linear feedback shift register. Trellis bit streams u3, u2, and u1 appear at the inputs 132 as a stream of bits $u3_0$, $u3_1$, $u3_2$, $u3_3$ . . . $u3_7$ . . . , $u2_0$, $u2_1$, $u2_2$, $u2_3$ . . . $u2_7$ . . . , $u1_0$, $u1_1$, $u1_2$, $u1_3$ . . . $u1_7$ . . . The bit stream u3 provides the output v0 directly at input 132. The output v1 is produced by exclusive OR gate 134 in response to the u3 input and u1 input. Output w0 is produced by exclusive OR gate 136 in response to the u3 and u2 inputs. The output w1 is provided by exclusive OR gate 138 in response to all of the inputs, u3, u2, u1 plus the output state s3 of linear feedback shift register 122 on line 40.

In operation, at each cycle of the clock, column 150, FIG. 10, the states s0, s1, s2, and s3 as a function of the u1 . . . u3 inputs and the pervious S1 . . . S3 states will be as shown in Chart I.

Figure 11:
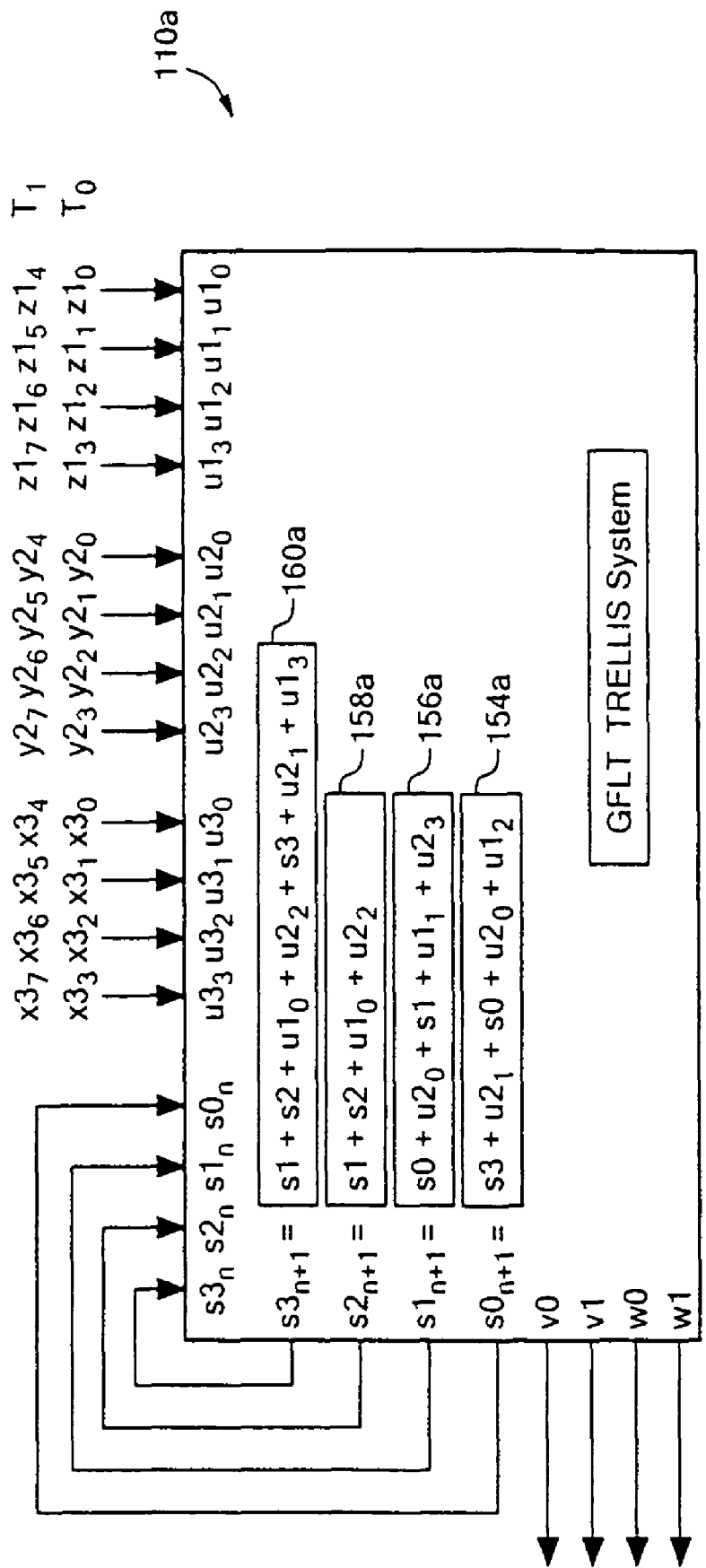
FIG. 11 is a more detailed schematic block diagram of the reconfigurable Galois field linear transformer trellis system of FIG. 5.
Figure 13:
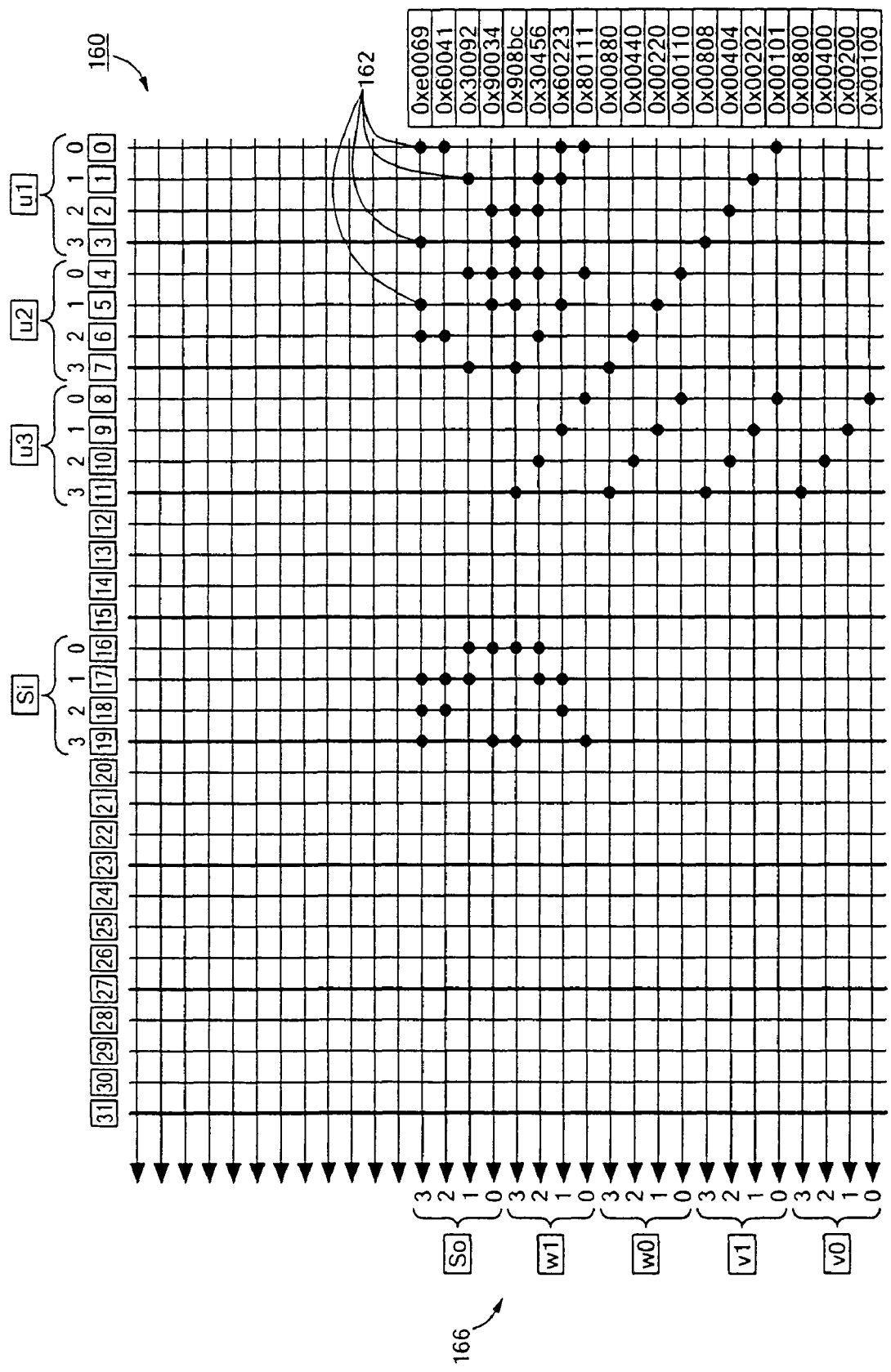
FIG. 13 is a more detailed schematic diagram of the Galois field linear transformer matrix configured to produce the trellis output channel symbols from the input bits in one cycle.

Galois field linear transformer trellis system 110a, FIG. 11, can process four, eight twelve, sixteen or any number of bits simultaneously depending upon the size of the Galois field linear transformer matrix that is acceptable in a particular application. This is shown in FIG. 11, where the generalized trellis bit stream inputs $u1_0$-$u1_3$, $u2_0$-$u2_3$, $u3_0$-$u3_3$, are shown all accepted simultaneously. The specific bits are shown for first tick or clock cycle as $z1_0$, to $z1_3$, $y2_0$ through y23 and $x3_0$ through $x3_3$. Since in this particular example GFLT trellis system 10 is accepting four bits at a time, its output in true Galois field transformer form will present the output corresponding to the fourth clock cycle or clock cycle number three in the boxed area 152 of Chart I, FIG. 10. These values for states s0, s1, s2, and s3, shown at 154, 156, 158, and 160 in Chart I, FIG. 10, are thus the new trellis states, 154a 156a, 158a, and 160a, FIG. 11. They are the new trellis states, $s0_{n+1}$, $s1_{n+1}$, $s2_{n+1}$, . . . , $s3_{n+1}$ and are fed back to the trellis inputs $s3_n$, $s2_n$, $s1_n$, $s0_n$.

On the next or second clock cycle designated clock cycle, 0, Chart II, FIG. 12, state $s0_{n+1}$ is shown in column 151 as, the exclusive OR combination of s3, $y2_1$ ($y2_1$ is the present value of $u2_1$), s0, $y2_0$, ($y2_0$ is the present value of $u2_0$), and $z1_2$, ($z1_2$ is the present value of $u1_2$). This can be expanded as shown in the second column 153 and then have redundancy eliminated (modulo two addition) as shown in the third column 155 to provide the next trellis state, the same thing can be done for $s1_{n+1}$, $s2_{n+1}$, and $s3_{n+1}$. The outputs v0, v1, w0 and w1 are not tabulated in chart form as they are straightforward exclusive OR combinations of the signals, as shown for example, on the Galois field linear transform trellis system matrix 160, FIG. 13. There it can be seen that by enabling the exclusive OR gate cells 162 at selected junctions of the rows and columns of matrix 160 the outputs required in Charts I, and II are obtained. For example, referring to Chart II, FIG. 12, the value of s3 can be seen as the exclusive OR combination of s1, s2, s3, $u2_1$, $u2_2$, $u1_3$ and $u1_0$, for $w0_3$, for example, the expression would be simply $u3_3$ and $u2_3$ exclusively Ored; for $v1_2$ it would be $u3_2$ and $u1_2$ exclusively ORed and so on.

For further explanation see U.S. patent application Ser. No. 10/753,301, filed Jan. 7, 2004, entitled GALOIS FIELD LINEAR TRANSFORMER TRELLIS SYSTEM by Stein et al. herein incorporated in its entirety by this reference.

Figure 14:
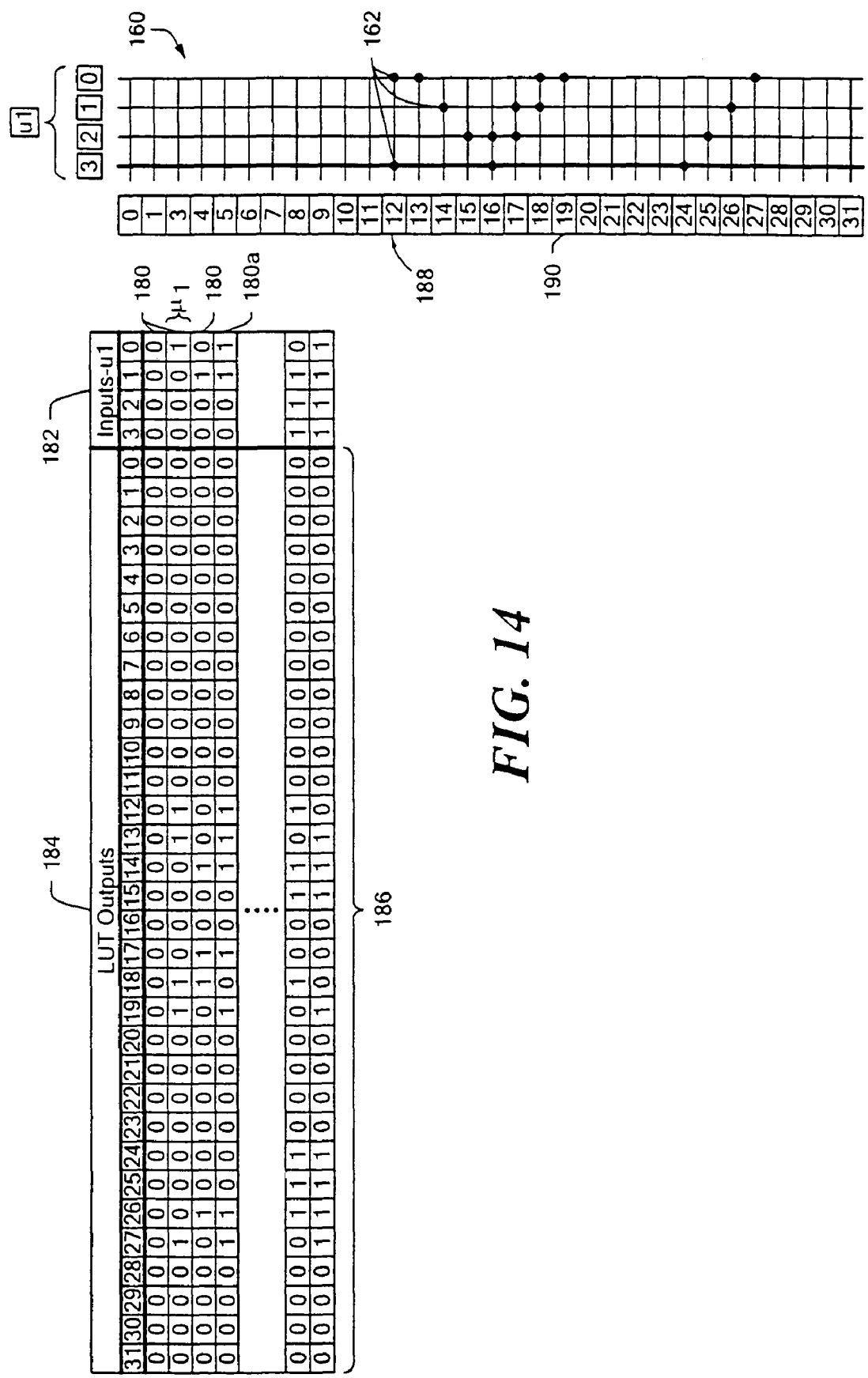
FIG. 14 depicts a transformation from a nibble of the matrix of FIG. 13 to a lookup table addressing system according to this invention.

One advantage of the use of this invention in this environment is that the need for a thirty-two by thirty-two matrix of exclusive OR gates or a lookup table of $2^{32}$ capacity can be avoided. This is taught in FIG. 14 where one nibble from FIG. 13, the one depicted as u1, is repeated showing all the exclusive OR gates 162 that it requires in the thirty-two rows of its four columns. In accordance with this invention the sixteen different possible combinations of 1s and 0s that can occur in that four bit nibble are shown in the sixteen rows 180 of column 182. The LUT outputs 184 are shown in the corresponding rows 180 of columns 186. For example, choosing the combination of bits 0011 for u1 as indicated at 180a, the LUT output for the $12^{th}$ row, 188, containing two exclusive OR gates, one in the zero position and one in the three position is a "1". For the $19^{th}$ row, 190, containing one exclusive OR gate, with the same combination of bits, 0011, the LUT output is "1". Thus the entire matrix of exclusive OR gates can be replaced by a lookup table and in accordance with this invention that lookup table need not be $2^{32}$ entries of thirty-two bit each but, can be group of a set of tables including eight tables of sixteen entries each of thirty-two bits (or a 512 byte LUT).

Figure 15:
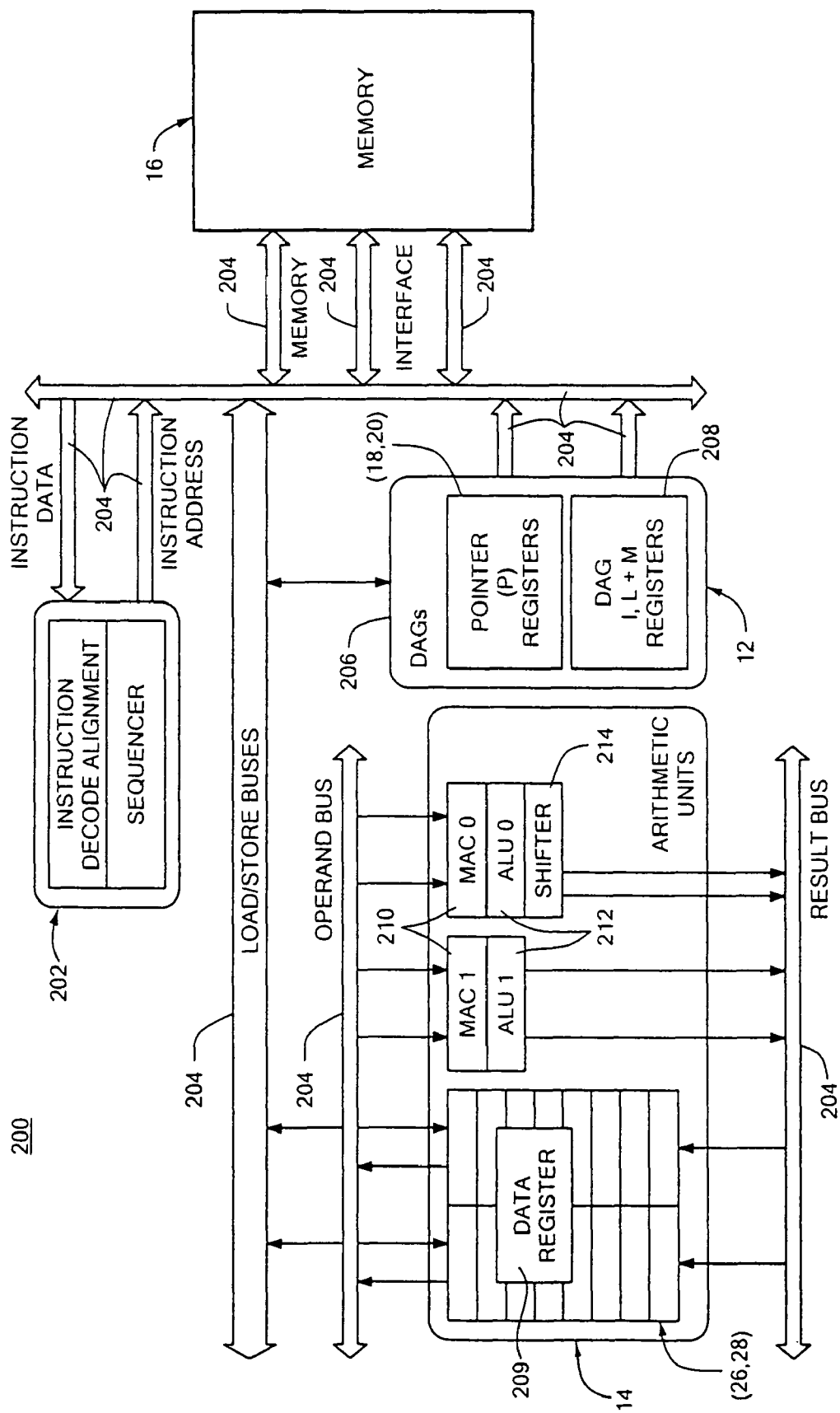
FIG. 15 is a schematic block diagram of a digital signal processor used to implement this invention.

The invention may be conveniently implemented in a processor such as a digital signal processor DSP 200, FIG. 15, where DAG 12, CU 14, and memory 16 communicate with each other and sequencer 202 by means of various buses 204. DAG 12 includes pointer register file 206 including input register 18 and deposit-increment index register 20 and other registers 208, such as conventional I, L, and M registers. CU 14 may include data register file 208, such as LUT destination register 26 and accumulator register 28 along with multiply and accumulate units 210, arithmetic logic units 212 and shifter 214.

Figure 16:
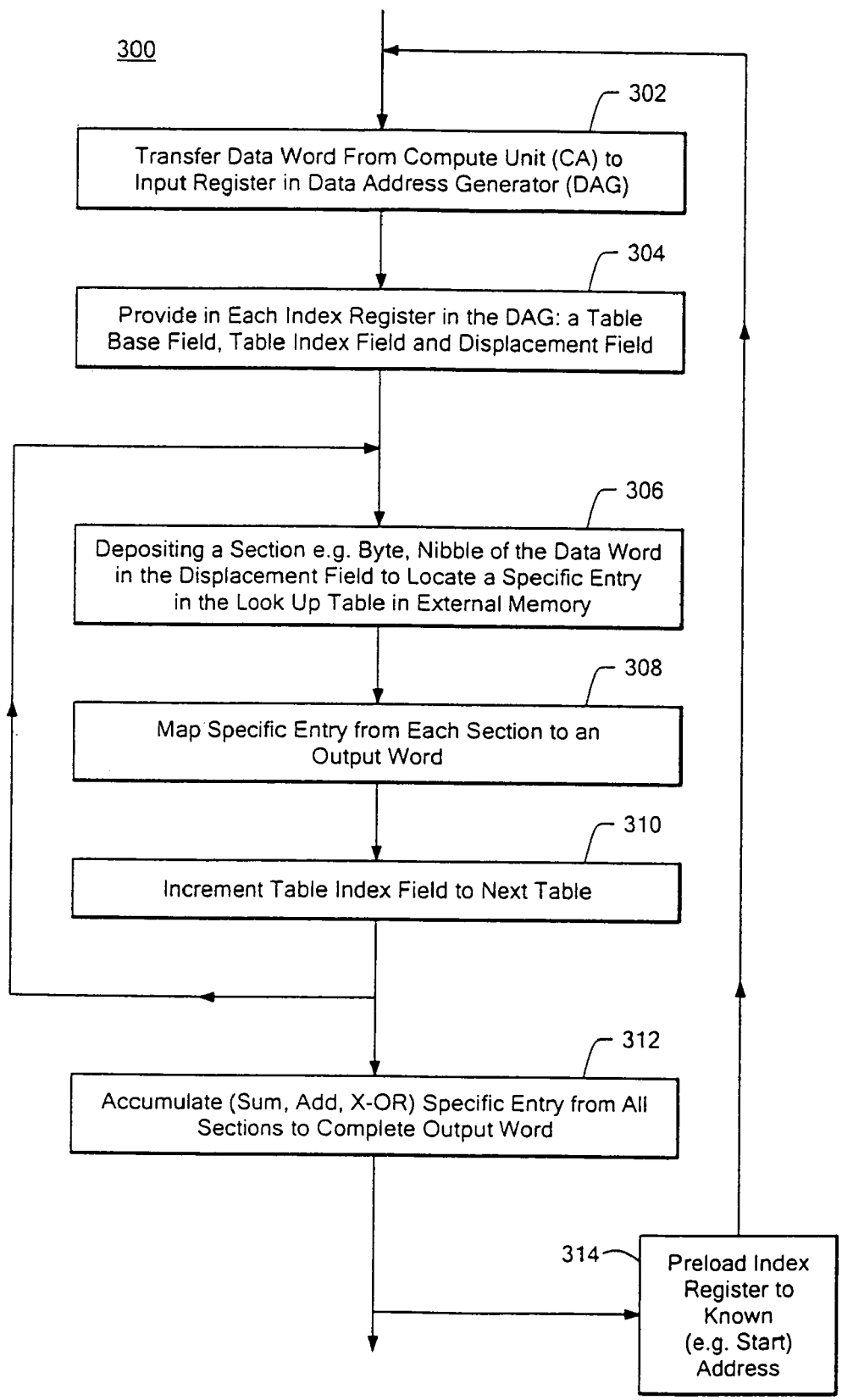
FIG. 16 is a block diagram of the lookup table addressing method according to this invention.

One implementation of lookup table addressing method 300, FIG. 16, according to this invention includes transferring, 302, a data word from a compute unit to an input register in a data address generator. There is provided, 304, in each index register in the DAG a table base field, table index field, and displacement field. A section such as a byte or a nibble of the data word is deposited, 306, in a displacement field to locate a specific entry in the lookup tables in external memory. A specific entry is mapped, 308, from each section to an output word. The table index field is incremented, 310, to the next table. After this the system returns to step 306 for as long as there are sections left to complete. After that, specific entries are accumulated, 312, by e.g., summing, adding, x-ORing from all sections to complete the output word. Finally, the index register is preloaded, 314, to a known, e.g., START address and the system returns again to retrieve and transfer, 302, a data word.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A lookup table addressing system having a set of lookup tables in an external memory comprising:
a data address generator including an input register for receiving a data word from a compute unit, the data word comprising a plurality of sections, each section comprising a reference to an entry in a table in the set of lookup tables and at least one deposit-increment index register having a table base field for identifying a location of the set of lookup tables in said external memory, a table index field identifying a location of a specific table in the set of lookup tables, and a displacement field for identifying a location of a specific entry in the specific table, said data address generator configured to deposit a section of the plurality of sections of said data word into said displacement field to access a partial result corresponding to said data word section before incrementing said table index field and depositing remaining sections of said data word to retrieve partial results corresponding to the remaining sections of said data word for each table in the set of lookup tables.

2. The lookup table addressing system of claim 1 in which said specific entries include partial results of the corresponding section of said data word.

3. The lookup table addressing system of claim 2 wherein the compute unit includes an accumulator, a lookup table destination register and a combining circuit, said compute unit configured to accumulate said partial results from all of the plurality of sections of the data word to obtain the final result.

4. The lookup table addressing system of claim 3 in which said destination register can be any one of the compute unit data register files.

5. The lookup table addressing system of claim 1 in which said data address generator includes a plurality of pointer registers and said deposit-increment index register is implemented by one of said pointer registers.

6. The lookup table addressing system of claim 1 in which said data address generator is further configured to increment the table base field of the deposit-increment index register to identify the next table in the set of lookup tables.

7. The lookup table addressing system of claim 2 in which said partial result includes data bits of the corresponding section and the data address generator is further configured to map those bits to a predetermined output word.

8. The lookup table addressing system of claim 7 in which the output word and the data word have an equal number of bits.

9. The lookup table addressing system of claim 7 in which the output word and the data word have an unequal number of bits.

10. The lookup table addressing system of claim 3 in which said combining circuit is an exclusive OR circuit.

11. The lookup table addressing system of claim 3 in which said combining circuit is a summing circuit.

12. The lookup table addressing system of claim 1 in which said data address generator includes a second deposit-increment index register and said data address generator is configured to deposit a second section of the data word into a displacement field of the second deposit-increment index register.

13. The lookup table addressing system of claim 1 in which said data address generator is configured to preload said deposit-increment index register to a known table address.

14. The lookup table addressing system of claim 13 in which the known table address is a start address of a table.

15. The lookup table addressing system of claim 1 in which said section is a bit field.

16. The lookup table addressing system of claim 15 in which said bit field is a byte.

17. The lookup table addressing system of claim 15 in which said bit field is a nibble.

18. A lookup table addressing method for servicing a set of lookup tables in an external memory comprising:
transferring a data word from a compute unit to an input register in a data address generator, the data word comprising a plurality of sections, each section comprising a reference to an entry in a table in the set of lookup tables;
providing in at least one index register in the data address generator a table base field for identifying a location of the set of lookup tables in said external memory, a table index field identifying a location of a specific table in the set of lookup tables, and a displacement field for identifying a location of a specific entry in the specific table;
depositing a section of the plurality of sections of the data word into the displacement field in said index register for identifying a location of a partial result corresponding to said data word section; and incrementing said table index field and depositing remaining sections of said data word to retrieve partial results corresponding to said remaining sections of said data word for each table in the set of lookup tables.

19. The lookup table addressing method of claim 18 in which said specific entries include partial results of the corresponding section of said data word.

20. The lookup table addressing method of claim 19 further including accumulating the partial results from all sections of the data word to obtain the final results.

21. The lookup table addressing method of claim 18 wherein incrementing said index register comprises incrementing, in the data address generator, a table base field to identify the next table in the set.

22. The lookup table addressing method of claim 19 in which said partial result includes data bits and further including mapping those bits to a predetermined output word.

23. The lookup table addressing method of claim 22 in which the output word and the data word have an equal number of bits.

24. The lookup table addressing method of claim 22 in which the output word and the data word have an unequal number of bits.

25. The lookup table addressing method of claim 20 in which accumulating includes exclusive-ORing.

26. The lookup table addressing method of claim 20 in which accumulating includes summing.

27. The lookup table addressing method of claim 18 further including depositing a second section of the data word into another index-register displacement field for identifying the location of another specific entry in parallel with the specific entry.

28. The lookup table addressing method of claim 18 further including preloading the index register to a known table address.

29. The lookup table addressing method of claim 28 in which the deposit-increment index register is preloaded to the starting address of a table.

30. The lookup table addressing method of claim 28 in which said section is a bit field.

31. The lookup table addressing method of claim 30 in which said bit field is a byte.

32. The lookup table addressing method of claim 30 in which said bit field is a nibble.

* * * * *